United States Patent
Grabbe et al.

(10) Patent No.: US 11,275,151 B2
(45) Date of Patent: Mar. 15, 2022

(54) METHOD FOR SETTING UP A SURVEILLANCE ZONE IN ONE GOODS LOGISTICS FACILITY AND LOCATION SYSTEM FOR A GOODS LOGISTICS FACILITY

(71) Applicant: Jungheinrich AG, Hamburg (DE)

(72) Inventors: Florian Grabbe, Hamburg (DE); Stefan Ahrens, Rellingen (DE); Sven-Ole Heise, Osterrönfeld (DE); Jan Kopelke, Hamburg (DE); Tony Altmann, Brokstedt (DE)

(73) Assignee: Jungheinrich AG, Hamburg (DE)

( * ) Notice: Subject to any disclaimer, the term of this patent is extended or adjusted under 35 U.S.C. 154(b) by 339 days.

(21) Appl. No.: 16/292,492

(22) Filed: Mar. 5, 2019

(65) Prior Publication Data
US 2019/0271763 A1    Sep. 5, 2019

(30) Foreign Application Priority Data

Mar. 5, 2018    (DE) .................... 10 2018 104 998.6

(51) Int. Cl.
| | |
|---|---|
| *G01S 7/40* | (2006.01) |
| *H04W 4/33* | (2018.01) |
| *G01S 13/02* | (2006.01) |
| *G01S 13/56* | (2006.01) |

(Continued)

(52) U.S. Cl.
CPC ........ *G01S 7/4004* (2013.01); *G01S 13/0209* (2013.01); *G01S 13/56* (2013.01);
(Continued)

(58) Field of Classification Search
CPC ..... H04W 4/021; H04W 4/029; H04W 64/00; H04W 64/006; H04W 4/33; H04W 4/02;
(Continued)

(56) References Cited

U.S. PATENT DOCUMENTS

| | | | | |
|---|---|---|---|---|
| 6,384,740 B1 * | 5/2002 | Al-Ahmed | ............. | G08G 1/017 340/466 |
| 9,078,098 B1 * | 7/2015 | Cronin | .................. | H04W 4/027 |

(Continued)

FOREIGN PATENT DOCUMENTS

| | | |
|---|---|---|
| CN | 105151624 A | 12/2015 |
| CN | 105472566 A | 4/2016 |

(Continued)

*Primary Examiner* — Olumide Ajibade Akonai
(74) *Attorney, Agent, or Firm* — Rankin, Hill & Clark LLP

(57) ABSTRACT

The invention relates to a method for setting up a surveillance zone (4) of a location system for acquiring the position of at least one movable object within a goods logistics facility (2), a method for operating such a location system, and a location system for a goods logistics facility (2). The method for setting up the surveillance zone (4) includes the following steps of the method: Moving a zone setting up apparatus (50) along a closed movement path (6) within an acquisition range and simultaneously capturing at least three different path positions (7) of the zone setting up apparatus (50), determining a route of an outer boundary (5) of the surveillance zone (4) to be set up based on the path positions (7) acquired, and defining an area enclosed by the outer boundary (5) as a surveillance zone (4).

8 Claims, 3 Drawing Sheets

(51) Int. Cl.
*G06Q 50/28* (2012.01)
*G06Q 50/00* (2012.01)

(52) U.S. Cl.
CPC ............. *G06Q 50/00* (2013.01); *G06Q 50/28* (2013.01); *H04W 4/33* (2018.02)

(58) Field of Classification Search
CPC ........ H04W 4/023; H04W 4/38; G08G 5/006; G08G 5/0069; G01S 5/0284; G01S 5/02; G01S 5/0263; G01S 7/4004; G01S 13/0209; G01S 13/56; G06Q 50/00; G06Q 50/28; B65G 1/00; B65G 1/0492; B65G 2203/04
See application file for complete search history.

(56) References Cited

U.S. PATENT DOCUMENTS

| | | | |
|---|---|---|---|
| 9,547,945 | B2 | 1/2017 | McCabe et al. |
| 10,086,756 | B2 | 10/2018 | Manci et al. |
| 2008/0161986 | A1* | 7/2008 | Breed ................... G01S 19/48 701/23 |
| 2012/0239224 | A1 | 9/2012 | McCabe et al. |
| 2013/0225196 | A1* | 8/2013 | James .................. H04W 4/022 455/456.1 |
| 2017/0067385 | A1* | 3/2017 | Hunt .................... B60W 40/09 |
| 2017/0134902 | A1 | 5/2017 | Mottazzi et al. |
| 2017/0289754 | A1* | 10/2017 | Anderson ............ H04W 4/029 |
| 2018/0091940 | A1* | 3/2018 | Gonzalez .............. H04W 4/026 |
| 2018/0348773 | A1 | 12/2018 | Hoerster |

FOREIGN PATENT DOCUMENTS

| | | | | |
|---|---|---|---|---|
| CN | 107615312 | A | 1/2018 | |
| DE | 102013103002 | A1 | 9/2014 | |
| EP | 2500871 | A1 | 9/2012 | |
| EP | 2851331 | A1 | 3/2015 | |
| EP | 3079381 | A1 * | 10/2016 | .......... H04W 40/244 |
| WO | 2017102444 | A1 | 6/2017 | |

* cited by examiner

METHOD FOR SETTING UP A SURVEILLANCE ZONE IN ONE GOODS LOGISTICS FACILITY AND LOCATION SYSTEM FOR A GOODS LOGISTICS FACILITY

PRIORITY CLAIM

This application claims priority to DE 10 2018 104 998.6, filed Mar. 5, 2018, which is hereby incorporated by reference in its entirety.

BACKGROUND OF INVENTION

Field of Invention

The invention relates to a method for setting up a surveillance zone of a location system for acquiring the position of at least one mobile object in a goods logistics facility. Furthermore, the invention relates to a method for operating a location system and a location system for a goods logistics facility.

Brief Description of Related Art

In goods logistics facilities such as warehouses, the position acquisition of various movable objects such as persons, industrial trucks, or goods, is advantageous for an efficient operation. With location systems that enable such a position acquisition, it is possible for example to understand and optimize distances traveled, verify locations, and avoid collisions.

Location systems frequently include anchor nodes that are arranged at defined fixed points. The position of a movable object relative to these anchor nodes is determined using for example multilateration.

It is advantageous if surveillance zones can be defined throughout a goods logistics facility. These surveillance zones can for example be quarantine zones or protection zones or can be set up as zones with speed limits for industrial trucks.

In order to define such surveillance zones, it is possible to for example dispose a transponder within the goods logistics facility. All industrial trucks that are within range of a signal emitted by the transponder are for example automatically slowed down. It is, however, disadvantageous that it is only possible to define a circular range surrounding the transponder as a surveillance zone in this manner, which does not represent a satisfactory solution for all fields of application.

Alternatively, a location system can be set up with a coordinate system. In this case, it is possible to show a schematic representation of an acquisition range of the position system e.g. on a display of the location system. On this display, the surveillance zone can be highlighted or marked up by means of user input in order to define the range included in the surveillance zone. First, however, this requires that such a schematic representation of an acquisition range be created, for example by precise surveying of the goods logistics facility. Such a survey involves a significant amount of work, though, which must be repeated for every change in the spatial situation within the acquisition range.

It is an object of the invention to provide a method for setting up a surveillance zone of a location system within a goods logistics facility, a method for operating a location system within a goods logistics facility, and a location system for a goods logistics facility with which a surveillance zone can be set up with low complexity.

BRIEF SUMMARY OF THE INVENTION

This object is solved by a method for setting up a surveillance zone of a location system for acquiring the position of at least one movable object within a goods logistics facility, wherein the method is further developed by the following steps of the method:
  Moving a zone setting up apparatus within an acquisition range the location system along a closed movement path and
  Simultaneously acquiring at least three different path positions of the zone setting up apparatus,
  Determining a route of an outer boundary of the surveillance zone to be set up from the path positions acquired, and
  Defining an area enclosed by the outer boundary as a surveillance zone.

A movable object within the context of the present description s for example a user end device or an industrial truck. A goods logistics facility is, for example, a warehouse or open-air space, an industrial building, a workshop building, a contiguous complex of such buildings or open-air spaces, and, if applicable, surrounding works premises.

The zone setting up apparatus is advantageously equipped with communications means by means of which the position of the zone setting up apparatus can be determined within the acquisition range of the location system.

Advantageously, with the method according to the invention it is possible to set up a surveillance zone within the acquisition range of the location system without having to survey the goods logistics facility first. Additionally, such a surveillance zone is not limited to a circular shape as would frequently be the case if a transponder were used for marking up the surveillance zone.

To set up the surveillance zone, the zone setting up apparatus is merely moved along a movement path, which substantially corresponds with the outer boundary of the zone to be set up. In doing so, the position of the zone setting up apparatus is acquired at least three times. These positions are stored as path positions. Subsequently, the outer boundary of the surveillance zone is determined on the basis of these path positions, wherein the area enclosed by the outer boundary is defined as a surveillance zone. The path positions thus span the surveillance zone. The surveillance zone can be freely defined.

In order to establish the surveillance zone, at least three path positions are required. Advantageously, however, a significantly greater number of path positions is acquired, as the precision with which the outer boundary follows the movement path of the zone setting up apparatus becomes greater as the number of path positions increases.

Preferably, the location system includes at least two anchor nodes, which define reference points within a coordinate system of the location system wherein a distance measurement is performed by means of signal transmission between the zone setting up apparatus and the at least two anchor nodes in order to acquire the at least three path positions.

An anchor node within the context of the present description is a stationary apparatus that is disposed in a defined and known location of the goods logistics facility. In other words, the positions of the anchor nodes are known within a common coordinate system. The anchor nodes have communications means for transmitting signals to the zone setting up apparatus and to a transmitter and receiver apparatus disposed on the movable object. By means of this signal transmission, it is possible for example to determine the distance between one of the anchor nodes and the zone setting up apparatus and between one of the anchor nodes and the movable object. For this purpose, a propagation delay measurement or a measurement of the signal strength can be performed, for example.

If the distance from a sufficiently large number of anchor nodes is known, the position of the zone setting up apparatus and/or the movable object can be determined, in relation to the anchor nodes. Usually, this requires three anchor nodes. Determining positions by means of measuring distances is also, referred to as multilateration. In some cases, it may also be sufficient to determine the distance between only two anchor nodes. The pertinent distance circles have two intersections, so that determining the positioning is not unambiguous. If, however, the pertinent anchor nodes are for example on an outer border of the goods logistics facility so that one of the two possible positions is outside the goods logistics facility, it is possible to ignore this position for positioning, and the determining of positions becomes unambiguous.

The anchor nodes form reference points within a coordinate system of the location system. The path positions, the positions of the zone setting up apparatus, and the positions of other movable objects that are equipped with a transmitter and receiver apparatus are assigned a unique coordinate point within the coordinate system. Likewise, the surveillance zone is assigned a coordinate range within the coordinate system.

A signal transmission between the anchor nodes and the zone setting up apparatus is preferably implemented by means of ultra-wideband technology. Likewise, additional signal transmissions preferably take place within the location system, for example between the anchor nodes and the transmitter and receiver apparatuses, by means of ultra-wideband technology. Alternatively or additionally, signal transmissions between the anchor nodes and the zone setting up apparatus and/or additional signal transmissions within the location system are implemented using another frequency band, particularly by means of other communications technologies such as WLAN or ZigBee.

In a preferred embodiment, the zone setting up apparatus is carried by a person while moving. Thereby, a simple, flexible and precise set-up of the surveillance zone is advantageously achieved.

In accordance with an alternative embodiment, the zone setting up apparatus is integrated in an industrial truck or is carried on an industrial truck. This is advantageous in particular when the surveillance zone to be set up has large dimensions.

Also preferably, a first user input starts the acquisition of the path positions, and a second user input completes the acquisition of the path positions, wherein the user inputs take place in particular on the, zone setting up apparatus. Advantageously, this achieves easy handling of the zone setting up apparatus and uncomplicated setting-up of the surveillance zone.

Preferably, the outer boundary is determined on the basis of the path positions by connecting each path position with a chronologically subsequently captured path position, particularly by means of interpolation by section, wherein a path position determined last is connected with a path position determined first, particularly by means of interpolation by section.

The connection of the path positions can for example be implemented by means of linear interpolation, working piece by piece. In one embodiment, path positions captured in sequence are connected with a line to one another. Alternatively, it is also possible to interpolate across more than two path positions. In this case, the interpolated outer boundary of the surveillance zone does not necessarily intersect every path position.

Instead of a linear interpolation, it is alternatively also possible to use polynomials of a higher degree, trigonometric functions, or similar functions for the interpolation. Alternatively or additionally, a spline interpolation can also be implemented. By connecting the path positions determined last with the path position determined first, the outer boundary is closed, so that the area enclosed is unambiguously defined. Even for the case that the outer boundary determined does not directly intersect the path position captured last and/or the path position captured first and/or another path position, an enclosed outer boundary is always determined.

The object is also solved by a method for operating a location system for acquiring the position of at least one movable object within a goods logistics facility with at least one surveillance zone that is set up using a method for setting up a surveillance zone according to one of the embodiments described above, wherein a position of the movable object is acquired and it is determined whether the movable object is located inside or outside the surveillance zone.

Advantageously, this method for operating a location system provides a surveillance zone that is easy to set up within which it is possible to monitor whether the movable object is located inside or outside this surveillance zone.

Preferably, a message is generated when the movable object is located inside the surveillance zone, wherein particularly this message is made available to another unit outside the location system or is transmitted to it.

Within the scope of, this method, a number of possible messages are provided to be generated in this manner. For example, the surveillance zone can be set up as a zone with a speed limit. The movable object in this case is an industrial truck, for example. if the industrial truck enters the surveillance zone, the location system transmits a message to a control system of the industrial truck in order to limit the speed. The control system of the industrial truck is hereby either part of the location system or it is a unit outside the location system. Alternatively, it is possible to issue a warning, e.g. on a display of the industrial truck, as a message that the industrial truck is located within a zone with a speed limit.

Additionally, the surveillance zone can also indicate a danger zone such as a crossing that is unclear. In this case, the speed of an industrial truck is limited for example when another movable object such as another industrial truck or a person is present in addition to the industrial truck within the surveillance zone. Additionally or alternatively, it is possible to issue a warning in this case on a display of the industrial trucks or on a warning apparatus that is carried by the person. Such a warning can also be issued as an acoustic and/or haptic signal. A haptic signal is particularly a vibrating of a part of the industrial truck, for example the steering wheel.

The surveillance zone can also be a range within the goods logistics facility where access is limited. If, for example, an industrial truck or a person is moving within the surveillance zone that does not fulfill the access requirements for said range, a warning is issued to the industrial truck, the person, and/or the supervisory staff as a message.

The reverse case is also conceivable, if for example only a certain range within the acquisition range of the location system is open to industrial trucks. In this case, the surveillance zone is the range open to the industrial trucks. A message is generated in this case when the industrial truck is located outside the surveillance zone.

It is also possible to define the region surrounding a door or a gate as a surveillance zone, wherein an opening mechanism of the door or gate is accessed by means of the message if a movable object is located within the surveillance zone.

Finally, the object is solved by a location system for a goods logistics facility that is further developed in that the location system is set up for determining the route of an outer boundary of a surveillance zone to be set up and for defining an area enclosed by the outer boundary as a surveillance zone by means of moving a zone setting up apparatus within an acquisition range of the location system along a closed movement path and by simultaneous acquisition of at least three different path positions of the zone setting up apparatus, wherein the location system is further set up for establishing based on position acquisition whether a movable object equipped with a transmitter and receiver apparatus is located inside or outside the surveillance zone.

The same or similar advantages apply to the location system as were previously mentioned with respect to the method for setting up a surveillance zone and the method for operating a location system.

Preferably, the location system includes at least two anchor nodes, which are set up for defining reference points within a coordinate system of the location system wherein a distance measurement is performed by means of signal transmission between the zone setting up apparatus and the at least two anchor nodes in order to acquire the at least three path positions.

Also preferably, the location system is set up for performing signal transmissions between anchor nodes and the zone setting up apparatus and/or between the anchor nodes and the transmitter and receiver apparatus using ultra-wideband technology.

Preferably, the location system is moreover set up for starting the acquisition of the path positions by means of a first user input and for completing the acquisition of the path positions by means of a second user input, wherein the user inputs take place in particular on the zone setting up apparatus.

Furthermore, the location system is preferably set up for generating a message when the movable object is located inside the surveillance zone, wherein particularly this message is made available to another unit outside the location system or is transmitted to it.

Further characteristics of the invention will become apparent from the description of embodiments according to the invention together with the claims and the included drawings. Embodiments according to the invention can fulfill individual features or a combination of several features.

BRIEF DESCRIPTION OF THE DRAWINGS

The invention is described below, without restricting the general idea of the invention using exemplary embodiments with reference to the drawings, wherein express reference is made to the drawings with regard to all details according to the invention that are not explained in greater detail in the text. In the following.

In the drawings, the same or similar elements andior parts are provided with the same reference numbers in order to prevent the item from needing to be reintroduced.

DETAILED DESCRIPTION OF THE INVENTION

Figure 1:
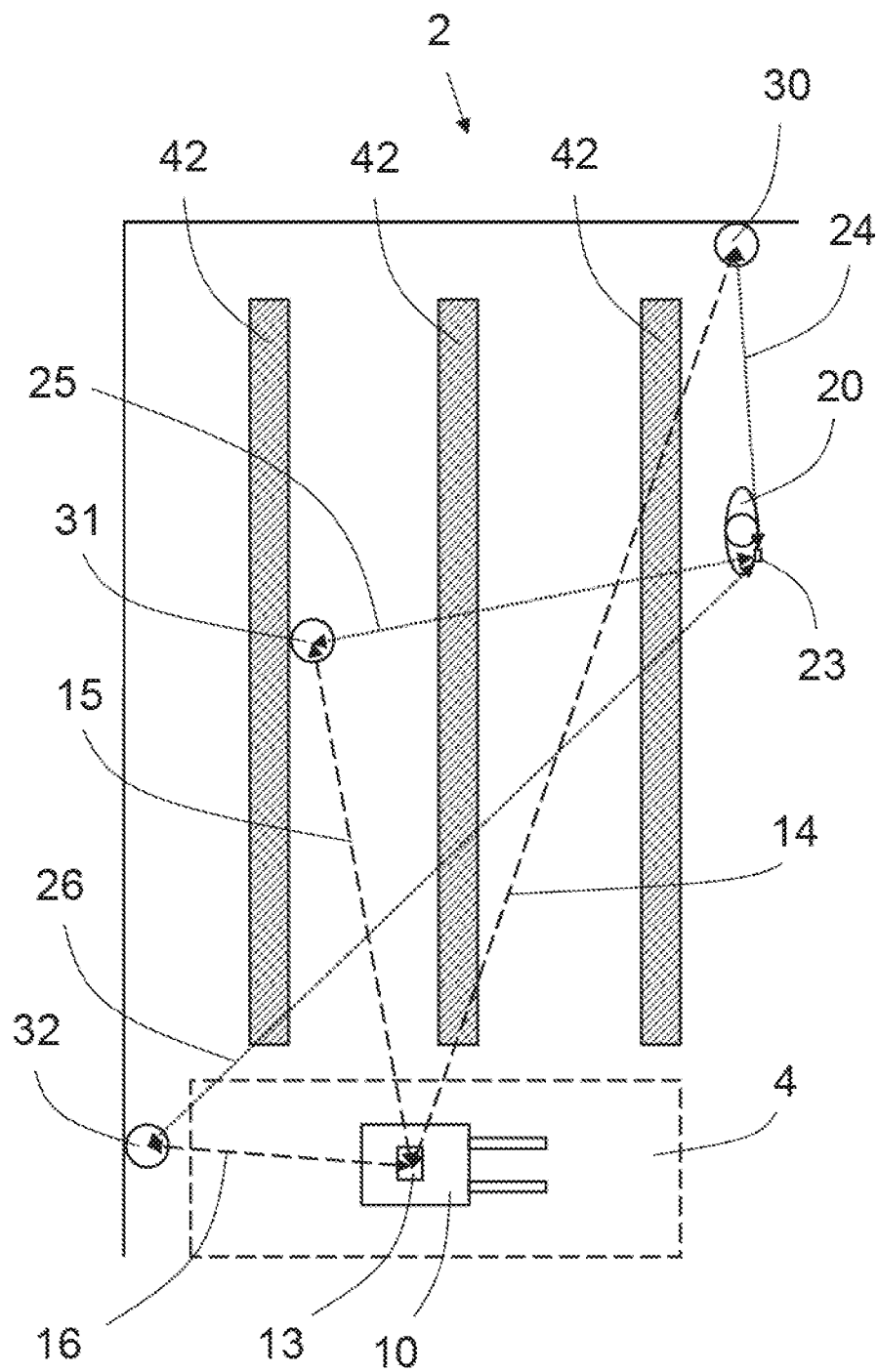
FIG. 1 shows a schematic simplified representation of a goods logistics facility with a surveillance zone.

FIG. 1 schematically shows a part of a goods logistics facility 2 such as a warehouse with several racks 42. The goods logistics facility 2 is equipped With a location system by means of which the positions of movable objects within an acquisition range of the positioning apparatus can be determined. For this purpose, several anchor nodes 30, 31, 32 are disposed in stationary positions throughout the goods logistics facility 2. The anchor nodes 30, 31, 32 define reference points fora coordinate system of the location system. Additionally, the anchor nodes 30, 31, 32 are equipped with communication means for signal transmission, for example for transmitting signals using ultra-wideband technology.

Within the goods logistics facility 2, an industrial truck 10 is present, which is equipped with a first transmitter and receiver apparatus 13, and a person 20, who is carrying a second transmitter and receiver apparatus 23 as a user end device. Using distance measurement by means of signal transmission. for example propagation delay measurements or measurements of the signal strength, between the anchor nodes 30, 31, 32 and the transmitter and receiver apparatuses 13. 23, the distances 14, 15, 16 between the anchor nodes 30, 3 32 and the industrial truck 10 as well as the distances 24, 25, 26 between the anchor nodes 30, 31, 32 and the user end device of the person 20 are determined. In this manner, the positions of the industrial truck 10, the person 20, or another movable object equipped with a transmitter and receiver apparatus 13, 23 can be determined within the acquisition range of the location, system. These positions are each assigned points within the coordinate system.

Within the acquisition range of the location system, a surveillance zone 4 is set up. The surveillance zone 4 is a virtual zone, which comprises a specific coordinate range within the coordinate system of the location system. The location system checks whether the industrial truck 10, the person 20, or another movable object is present inside or outside the surveillance zone 4. If the surveillance zone 4 is, for example, a zone with a speed limit, the speed of the industrial truck 10 is limited. Alternatively or additionally, a warning can be issued to the operator of the industrial truck 10 and/or to the person 20. In either case, a message is generated that is transmitted to the industrial truck 10, to the user end device of the person 20, or to another unit. This message is, for example, a prompt to a control system of the industrial truck 10 to limit the speed. The control system of the industrial truck 10 can also be part of the location system and limit the speed of the industrial truck 10 directly.

Figure 2:
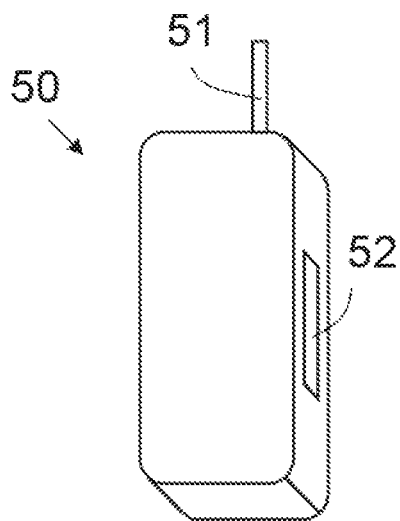
FIG. 2 shows a schematic simplified representation of a zone setting up apparatus.

FIG. 2 shows a schematic representation of a zone setting up apparatus 50. The embodiment of the zone setting up apparatus 50 in accordance with FIG. 2 is set up for being carried by a person, it is thus e.g. a user end device. The zone setting up apparatus 50 can also be a second transmitter and receiver apparatus 23, or the zone setting up apparatus 50 is part of the second transmitter and receiver apparatus 23, or the second transmitter and receiver apparatus 23 is part of the zone setting up apparatus 50. The zone setting up apparatus 50 comprises communication means 51 for transmitting signals with the anchor nodes 30, 31, 32. Additionally, the zone setting up apparatus 50 has a button 52 with which the setting up of the surveillance zone 4 is started and ended.

Figure 3:
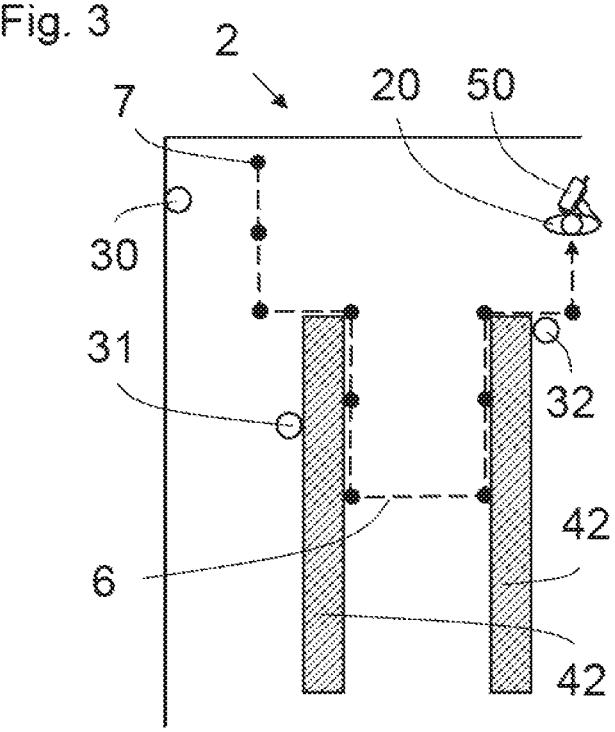
FIG. 3 to FIG. 5 show schematic simplified representations of a setting up process of a surveillance zone in a goods logistics facility.
Figure 4:
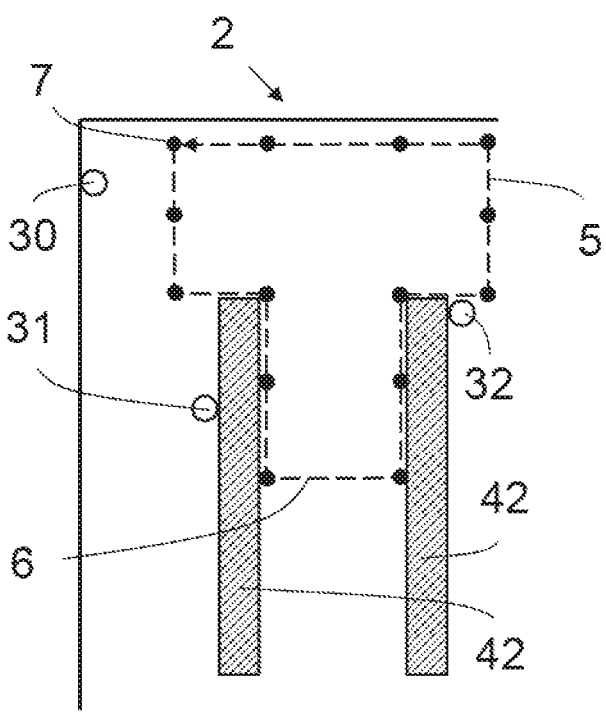
Figure 5:
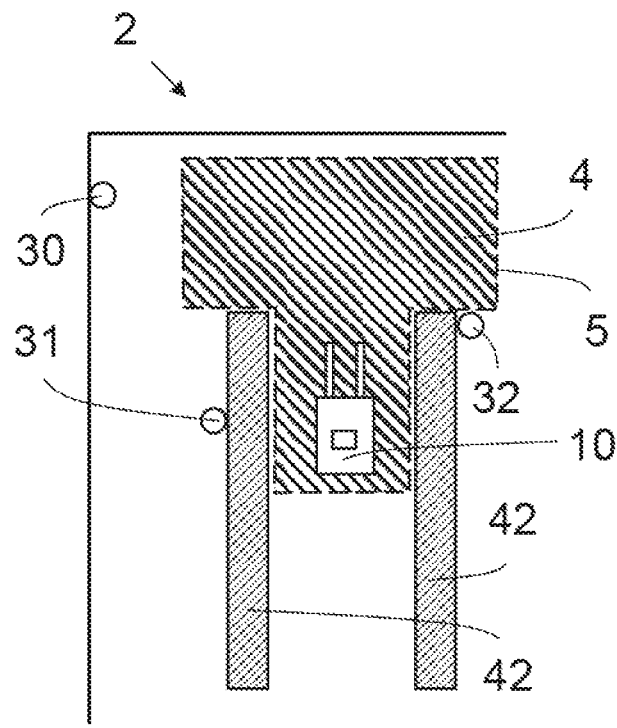

FIG. 3 to FIG. 5 schematically show examples of a setting up process for a surveillance zone 4. A person 20 is present within the acquisition range of the location system of a goods logistics facility 2 and carries a zone setting up apparatus 50 on them. To set up the surveillance zone 4, the person 20 positions themselves on a boundary of the surveillance zone 4 to be set up and actuates the button 52 of the zone setting up apparatus 60 for a first time. The location system starts a repeated acquisition of the positions of the zone setting up apparatus 50 and stores them as path positions 7. For example, the position of the zone setting up apparatus 50 is acquired at a time interval of a few seconds. For better clarity, FIG. 3 and FIG. 4 show only a few path positions 7 each as filled black circles. Simultaneously with the acquisition of the path positions 7, the person 20 begins to move along a movement path 6 as shown in FIG. 3.

After the person 20 has arrived at their starting position again, i.e., has completed a closed movement path 6, they actuate the button 52 a second time in order to finish the acquisition of path positions 7. As shown in FIG. 4, the location system then determines an outer boundary 5 of the surveillance zone 4 based on the path positions 7 acquired. The area enclosed by the outer boundary 5 is defined as a surveillance zone 4 as shown in FIG. 5. The surveillance zone 4 can for example be assigned a speed limit for industrial trucks 10, so that the speed of an industrial truck 10 entering the surveillance zone 4 can be limited. In this manner, the collision risk at an unclear crossing such as the exit path from two racks 42 can be reduced.

Figure 6:
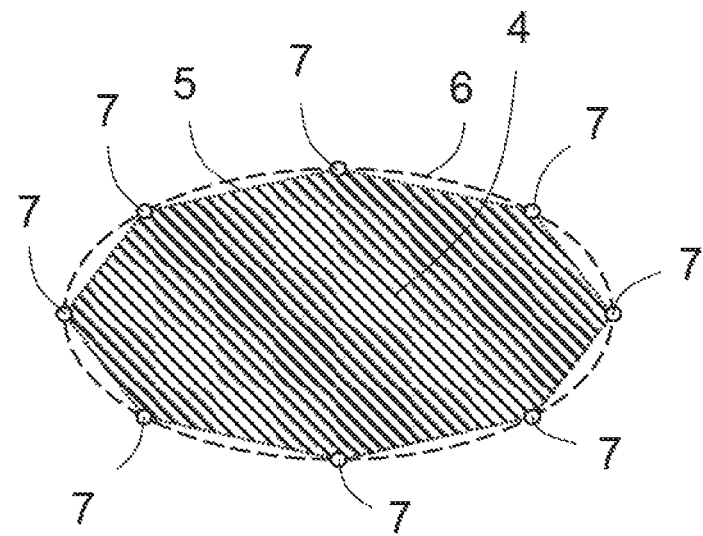
FIG. 6 shows a schematic simplified representation of determining a surveillance zone based on a movement path, path positions, and an outer boundary.

FIG. 6 schematically shows how the outer boundary 5 of the surveillance zone 4 is plotted from the path positions 7. The zone setting up apparatus 50 is moved along the movement path 6 for this purpose, which corresponds with the actual movement of the zone setting up apparatus 50. At regular intervals, the position of the zone setting up apparatus 50 is determined and stored as a path position 7. These path positions 7 are therefore located on the movement path 6.

Subsequently, the outer boundary 5 is determined on the basis of the path positions 7, and the area enclosed by the outer boundary 5 is defined as a surveillance zone 4. For determining the outer boundary 5 from the path positions 7, the path positions 7 can be connected for example by piecewise linear interpolation as shown in FIG. 6. As can be seen in FIG. 6, the outer boundary 5 does not necessarily follow the movement path 6 physically traveled in this case. In order to minimize this deviation, the number of path positions 7 can be increased, and/or other methods can be used for determining the outer boundary 5 such as cubic interpolation or the application of spline interpolation. Generally, the number of path positions 7 will be significantly higher than what is shown in FIG. 3 through FIG. 6, so that the outer boundary 5 will substantially follow the movement path 6.

All named characteristics, including those taken from the drawings alone and also individual characteristics which are disclosed in combination with other characteristics are considered, alone and in combination, as essential for the invention. Embodiments according to the invention can be fulfilled by individual features or a combination of several features. In the scope of the invention, characteristics which are designated with in particular or "preferably" are understood to be optional features.

TABLE OF REFERENCES

2 Goods logistics facility
4 Surveillance zone
5 Boundary
6 Movement path
7 Path position
10 Industrial truck
13 First transmitter and receiver apparatus
14, 15, 16 Distance
20 Person
32 Second Transmitter and Receiver Apparatus
24, 25, 26 Distance
30, 31 32 Anchor node
42 Rack
50 Zone setting up apparatus
51 Communication means
52 Button

What is claimed is:

1. A location system for a goods logistics facility, the location system comprising:
a zone setting up apparatus; and
at least two anchor nodes;
wherein the location system is configured to determine a route of an outer boundary of a surveillance zone to be set up and to define an area enclosed by the outer boundary as a surveillance zone by moving the zone setting up apparatus within an acquisition range of the location system along a closed movement path and by simultaneous acquisition of at least three different path positions of the zone setting up apparatus,
wherein the location system is further configured to establish, based on position acquisition, whether a movable object equipped with a transmitter and receiver apparatus is located inside or outside the surveillance zone,
wherein the at least two anchor nodes are configured to define reference points within a coordinate system of the location system,
wherein the location system is configured to perform a distance measurement by signal transmissions between the zone setting up apparatus and the at least two anchor nodes for the acquisition of the at least three different path positions,
wherein the location system is configured to generate a message when the movable object is located inside the surveillance zone and to make the message available to a unit outside thereof or to transmit the message to the unit outside thereof,
wherein the location system is configured such that the surveillance zone is a zone with a speed limit, and
wherein the location system is configured to transmit a warning message to a control system of the movable object when the movable object enters the inside the surveillance zone and the movable object is an industrial truck.

2. The location system according to claim 1, wherein the location system is configured to perform signal transmissions between the at least two anchor nodes and the zone setting up apparatus and/or between the at least two anchor nodes and the transmitter and receiver apparatus using ultra-wideband technology.

3. The location system according to claim 1, wherein the location system is configured to start the acquisition of the at least three different path positions by a first user input, and to complete the acquisition of the at least three different path positions by a second user input, and wherein the first and second user inputs take place on the zone setting up apparatus.

4. The location system according to claim 1, wherein the warning message transmitted to the control system of the industrial truck is configured to limit the speed of the industrial truck inside the surveillance zone.

5. The location system according to claim 1, wherein the warning message transmitted to the control system of the industrial truck is configured to be displayed on a display of the industrial truck to indicate that the industrial truck is located within the surveillance zone with the speed limit.

6. A location system for a goods logistics facility, the location system comprising:
- a zone setting up apparatus; and
- at least two anchor nodes;
- wherein the location system is configured to determine a route of an outer boundary of a surveillance zone to be set up and to define an area enclosed by the outer boundary as a surveillance zone by moving the zone setting up apparatus within an acquisition range of the location system along a closed movement path and by simultaneous acquisition of at least three different path positions of the zone setting up apparatus,
- wherein the location system is further configured to establish, based on position acquisition, whether a movable object equipped with a transmitter and receiver apparatus is located inside or outside the surveillance zone,
- wherein the at least two anchor nodes are configured to define reference points within a coordinate system of the location system,
- wherein the location system is configured to perform a distance measurement by signal transmissions between the zone setting up apparatus and the at least two anchor nodes for the acquisition of the at least three different path positions,
- wherein the location system is configured to generate a message when the movable object is located inside the surveillance zone and to make the message available to a unit outside thereof or to transmit the message to the unit outside thereof,
- wherein the location system is configured such that the surveillance zone is a danger zone,
- wherein the location system is configured to transmit a warning message to a control system of the movable object when the movable object enters the inside the surveillance zone,
- (ii) the movable object is an industrial truck, and
- (iii) another industrial truck is also present in the danger zone, and
- wherein the warning message is transmitted to limit the speed of the industrial truck in the danger zone.

7. The location system according to claim 6, wherein the warning message transmitted to the control system of the industrial truck is configured to be displayed on a display of the industrial truck, is configured to be an acoustic signal, or is configured to be a haptic signal in the form of a vibration of a part of the industrial truck.

8. A location system for a goods logistics facility, the location system comprising:
- a zone setting up apparatus; and
- at least two anchor nodes;
- wherein the location system is configured to determine a route of an outer boundary of a surveillance zone to be set up and to define an area enclosed by the outer boundary as a surveillance zone by moving the zone setting up apparatus within an acquisition range of the location system along a closed movement path and by simultaneous acquisition of at least three different path positions of the zone setting up apparatus,
- wherein the location system is further configured to establish, based on position acquisition, whether a movable object equipped with a transmitter and receiver apparatus is located inside or outside the surveillance zone,
- wherein the at least two anchor nodes are configured to define reference points within a coordinate system of the location system,
- wherein the location system is configured to perform a distance measurement by signal transmissions between the zone setting up apparatus and the at least two anchor nodes for the acquisition of the at least three different path positions,
- wherein the location system is configured to generate a message when the movable object is located inside the surveillance zone and to make the message available to a unit outside thereof or to transmit the message to the unit outside thereof,
- wherein the location system is configured such that the surveillance zone is a zone with limited access,
- wherein the location system is configured to transmit a warning message to a control system of the movable object or to supervisory staff when the movable object enters the inside the surveillance zone,
- (ii) the movable object is an industrial truck, and
- (iii) the industrial truck does not fulfill access requirements for the zone with limited access.

* * * * *

UNITED STATES PATENT AND TRADEMARK OFFICE
CERTIFICATE OF CORRECTION

PATENT NO. : 11,275,151 B2
APPLICATION NO. : 16/292492
DATED : March 15, 2022
INVENTOR(S) : Florian Grabbe et al.

It is certified that error appears in the above-identified patent and that said Letters Patent is hereby corrected as shown below:

In the Claims

In Column 9, Line 54, insert --(i)-- between the word "when" and the phrase "the movable object enters..."

In Column 10, Line 49, insert --(i)-- between the word "when" and the phrase "the movable object enters..."

Signed and Sealed this
Seventh Day of June, 2022

Katherine Kelly Vidal
*Director of the United States Patent and Trademark Office*